United States Patent
Mayer et al.

(10) Patent No.: US 7,542,199 B1
(45) Date of Patent: Jun. 2, 2009

(54) DMD COMPRISING NONPARALLEL MIRROR DEFLECTION AXES

(76) Inventors: Max Mayer, Hutstr. 39, Forchheim, Bavaria (DE) 91301; Bernhard Rudolf Bausenwein, Eichenstr. 32, Hagelstadt, Bavaria (DE) D-93095

( * ) Notice: Subject to any disclaimer, the term of this patent is extended or adjusted under 35 U.S.C. 154(b) by 0 days.

(21) Appl. No.: 12/003,686

(22) Filed: Dec. 31, 2007

(51) Int. Cl.
   *G02B 26/00* (2006.01)
   *G02B 26/08* (2006.01)
(52) U.S. Cl. .................. 359/290; 359/198; 359/225
(58) Field of Classification Search ........... 359/198, 359/214, 224, 225, 290, 298
   See application file for complete search history.

(56) References Cited

U.S. PATENT DOCUMENTS

| | | | |
|---|---|---|---|
| 5,600,383 A | 2/1997 | Hornbeck | |
| 6,250,763 B1 | 6/2001 | Fielding et al. | |
| 7,315,503 B2 * | 1/2008 | Cho et al. | 369/112.29 |
| 2005/0141076 A1 | 6/2005 | Bausenwein et al. | |
| 2007/0159680 A1 | 7/2007 | Bausenwein et al. | |
| 2007/0171533 A1 | 7/2007 | Bausenwein et al. | |

* cited by examiner

Primary Examiner—William C Choi

(57) ABSTRACT

The digital mirror device (DMD) is an array of single mirrors, which are deflectable on mirror deflection axes (MDAs, as e.g. characterized by their orientation with the array raster). In the state of the art, all single mirrors on a DMD have parallel MDAs. In our invention, the array is made of different classes of mirrors. These classes differ by the orientation of their MDAs. The invention relates to the simultaneous processing of different characteristics of light (e.g. color) by a single DMD-chip.

8 Claims, 4 Drawing Sheets

DMD COMPRISING NONPARALLEL MIRROR DEFLECTION AXES

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention uncovers a digital mirror device (DMD), which comprises an array of single deflectable mirrors with nonparallel axes of deflection. The invention relates to simultaneous processing of different light characteristics, e.g. spectral or polarization specifics, by a single DMD-chip.

The DMD according to the state of the art (Texas Instruments, Hornbeck 1997, U.S. Pat. No. 5,600,383) is made of an isomorphic array of single deflectable mirrors. Moreover, all mirrors are identical with regards to all aspects but their relative position (and address) in the array raster. The mirror deflection axes (MDA) of all single mirrors are parallel in the recent DMD. This is a consequence of functional requirements, where the modulation task of the chip is carried out on a single input beam (comp. FIG. 1). Accordingly, if different specificities of light have to be processed, as e.g. in color generation, this has to be achieved either by sequential processing using a single DMD (color wheel, e.g. Hornbeck, From cathode rays to digital mirrors, TI Tech. Journal, FIG. 53, 1998) or by parallel processing using one DMD per specificity (e.g. Tri Prism Assembly (TPA) with 3 DMDs, each of the primary colors is processed as a dedicated beam.

According to the specific orientation of the MDA (e.g. 45° to the image raster in the original DMD, Hornbeck, cit. above), this original DMD is a stereo-isomer (shows handedness), comp. FIG. 2. The lack of mirror-symmetric function aggravates the combination of two (Bausenwein and Mayer, US2005/0141076) or three (see below) DMDs.

In the simultaneous processing of color, a complex array of prisms (Tri Prism Assembly, TPA) is used in state of the art 3-chip displays (Fielding et al., U.S. Pat. No. 6,250,763 and Hornbeck, cit. above). Due to the stereo-isomeric characteristics, an even-numbered difference of the reflections downstream each DMD has to be used, making the TPA a bulky and expensive structure.

In our previous applications we have coupled two DMDs which have differently oriented MDAs with respect to the array raster (Bausenwein und Mayer, DE10361915, US2005/0141076, US2007/0159680, US2007/0171533) for a 2-channel display system. The two DMDs used in our previous work have a uniform array of identical single mirrors. Each DMD has its mirrors deflect on parallel MDAs. The usage of two different stereo-isomeric DMDs had advantages for the system design, but still required two DMDs.

BRIEF SUMMARY OF THE INVENTION

In this invention, we uncover a single DMD-chip that has different classes of mirrors. While the mirrors of a single class are deflected on parallel MDAs, the classes differ by the specific orientation of their MDAs (MDAs are non-parallel). The DMD of our invention can operate simultaneously on more than one input beam, with a common output "ON"-beam. Usually, each class of mirror will be dedicated to a certain input beam.

DETAILED DESCRIPTION OF THE INVENTION

Figure 1:
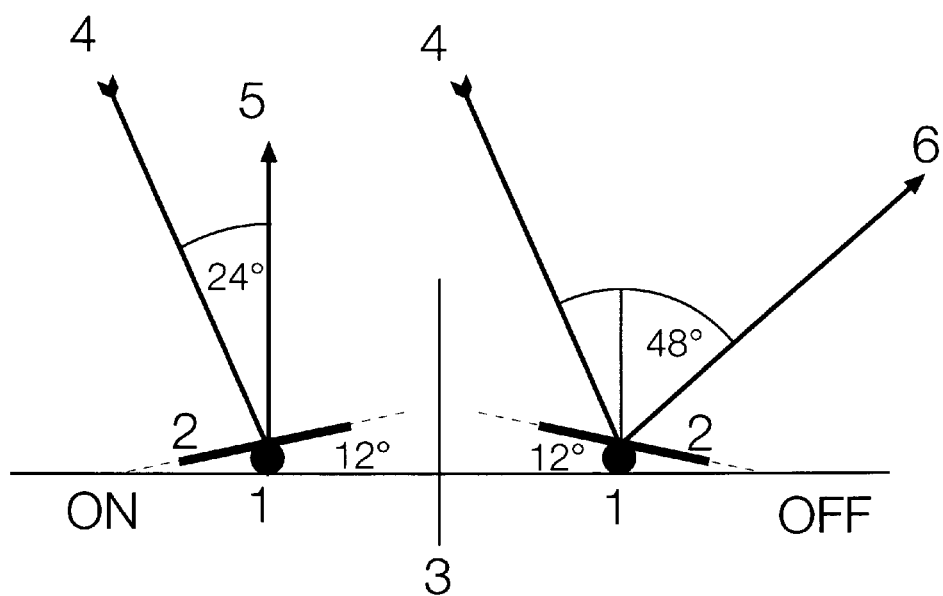
FIG. 1 is a schematic diagram illustrating the operation of a DMD.
Figure 2A:
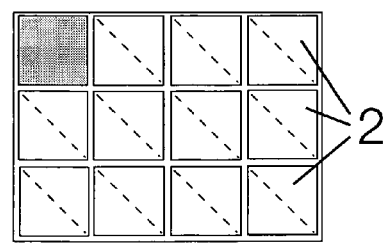
FIGS. 2A-B shows the stereo-isomeric topology of a DMD according to the state of the art.
Figure 2B:
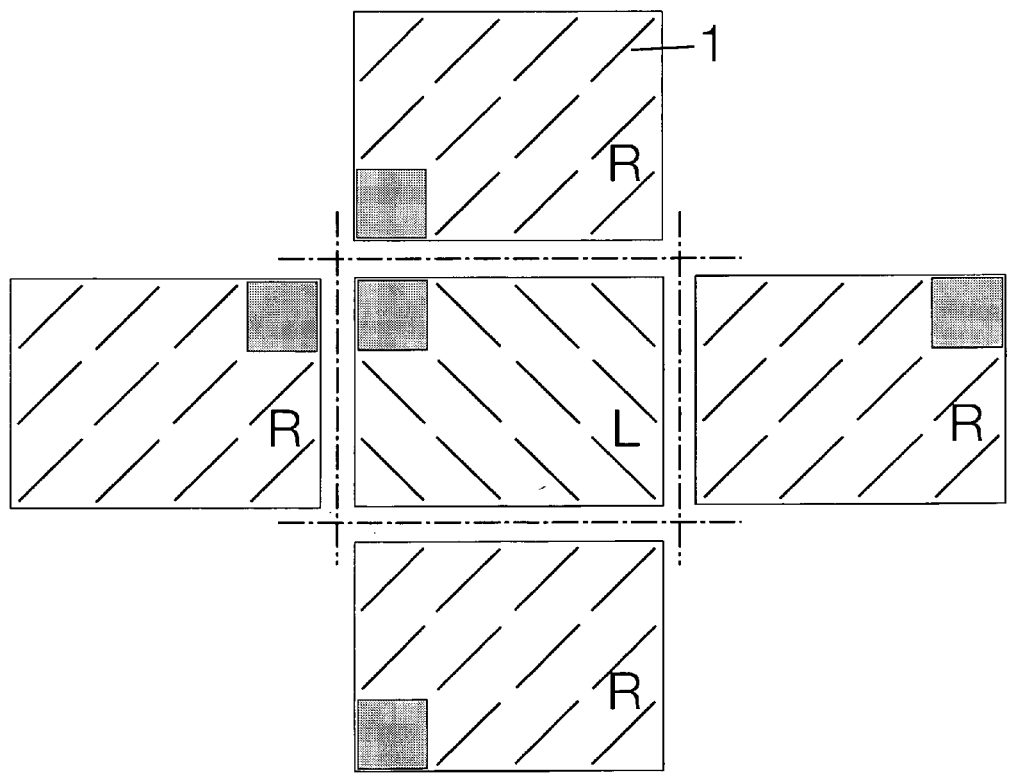

The figures are labeled in a way that identical numbers indicate identical components in all figures. Mirror deflection axis (1); single deflectable mirror (2); normal (3); incident beam (4); "On"-beam (5); "Off"-beam (6);

FIG. 3 shows schematic views of examplary arrangements of single mirrors of a DMD with three classes of mirrors with the classes having a different orientation of MDAs. In general, the three classes of mirrors will be homogeneoulsy distributed on the DMD surface. This can generally be reallized by various geometric solutions. FIGS. 3A-D show two geometric solutions of an homogenous distribution of mirrors belonging to three classes, which have orientations of the MDAs with cutting angles of 120 deg. (This is the largest angle difference for a system with three classes).

Figure 3A:
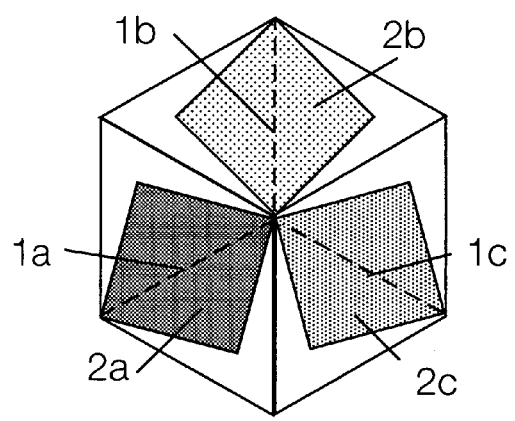
FIGS. 3A-B shows schematic views of arrangements comprising three classes of mirrors.
Figure 3C:
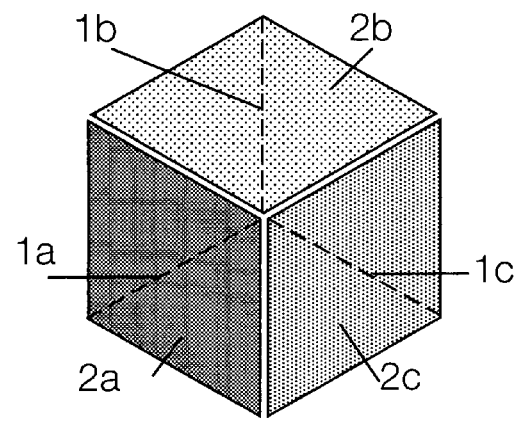
Figure 3B:
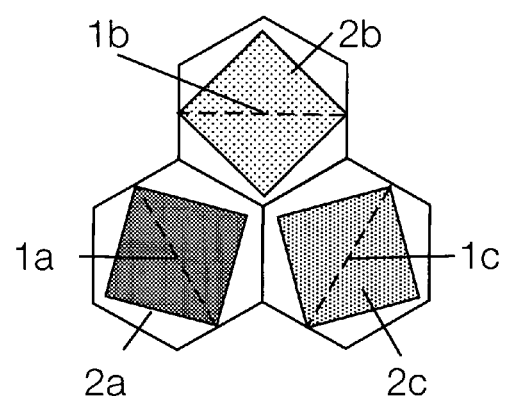
Figure 3D:
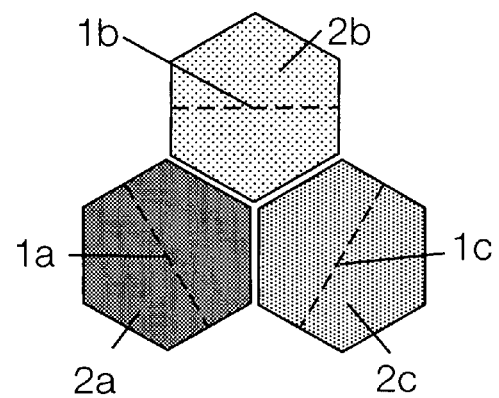

FIGS. 3C and 3D show two space-filling arrangements of mirrors. In FIG. 3C, the mirrors have rhomb-shapes and completely fill the chip surface. In FIG. 3D hexagonal mirrors are arranged in an hexagonal tiling and also fill the chip surface completely. In FIG. 3A quadratic mirrors (state of the art) are arranged in the same geometric rhomboid tiling of the surface as in FIG. 3C, resulting in a loss of efficiency compared to FIG. 3C. Accordingly, in FIG. 3B quadratic mirrors (the state of the art) are arranged in the hexagonal tiling of FIG. 3D, also resulting in some loss of efficiency. While the systems shown are based on a DMD with three classes of mirrors homogenously distributed in two exemplary geometric arrangements, these structures are showns as examples only, and DMDs with only two classes or with more than three classes can easily be deduced from our invention, as can alternative geometric distributions of said classes.

Figure 4:
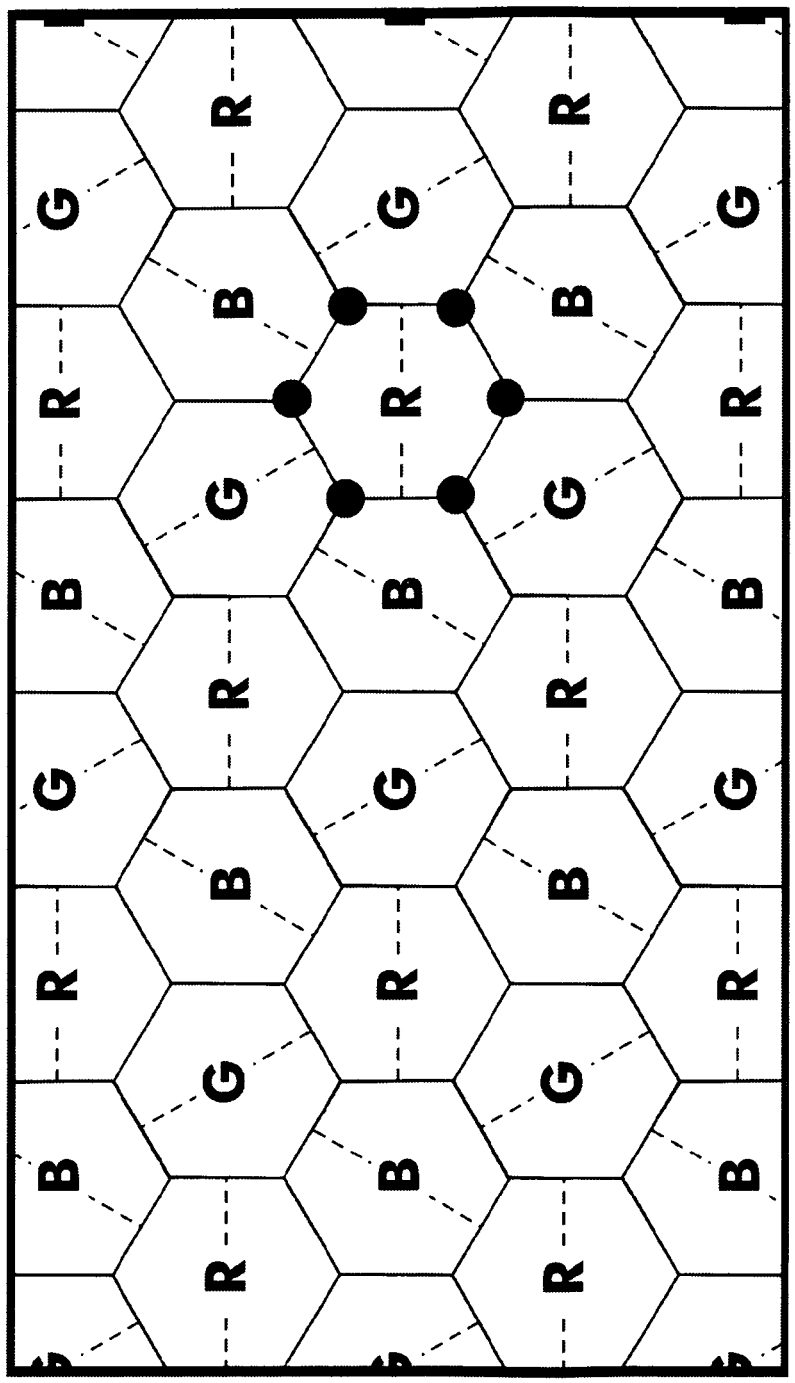
FIG. 4 shows an embodiment of our invention comprising three classes of hexagonal mirrors.

FIG. 4 shows an embodiment of the invention. Shown is a part of a DMD surface based on the unit structure shown in FIG. 3D. Here, the three classes of mirrors are nominated with "R", "G" "B". Such a system can generally be used with three different "IN"—beams, the incidence of which is adjusted to the three orientations of MDAs. While all classes of mirrors receive light from all "IN"-beams, each class reflects a different "IN"-beam to one common modulated "ON"-beam. When used as a spatial light modulator, the shown DMD might simultaneously modulate an image without color wheel. In that case, each image pixel can be generated by a triplet of mirrors, one of each class.

The filled circles indicate possible centers of triplets. While a first thought one might assume that the resolution of such a DMD with simultaneous color management is reduced by a factor of the number of classes (here three), because each single mirror is assumed to serve only as one color subpixel, in fact each mirror can serve as a color subpixel for six different pixels, centered at the shown triplet points (filled circles). This numerically results in two pixels/mirror. Thus, in fact, the resolution of the presented embodiment of our invention surpasses that of a colorwheel system, which resolves one pixel per single mirror.

It will be appreciated that whilst this invention is described by way of detailed embodiments, these realizations serve as illustrations of the invention but not as a limitation of the invention; numerous variations in form and detail can be deduced by those skilled in the art or science to which the invention pertains without leaving the scope of the invention as defined by the following claims:

The invention claimed is:

1. A digital mirror device (DMD) comprising
   a two dimensional array of electromechanically deflectable mirrors,
      each of said mirrors deflectable along its mirror deflection axis (MDA),
      said MDA characterized by its orientation to the array raster,
   said array consisting of more than two classes of mirrors, each class of mirrors characterized by parallel MDAs, MDAs of said classes being nonparallel,
   said array being described by the repetitive structure of raster units, said raster unit comprising exactly one mirror of each class of mirrors.

2. A DMD according to claim 1 comprising three classes of mirrors.

3. A DMD according to claim 2, said three orientations of the MDAs differing by 60 degrees.

4. A DMD according to claim 1 comprising four classes of mirrors.

5. A DMD according to claim 4, said four orientations of the MDAs differing by 45 degrees.

6. A DMD according to claim 1 comprising six classes of mirrors.

7. A DMD according to claim 6, said six orientations of the MDAs differing by 30 degrees.

8. A method of using a system as claimed in claim 1.

* * * * *